United States Patent
Christidis et al.

(10) Patent No.: US 10,678,598 B2
(45) Date of Patent: Jun. 9, 2020

(54) ENFORCING COMPUTE EQUITY MODELS IN DISTRIBUTED BLOCKCHAIN

(71) Applicant: International Business Machines Corporation, Armonk, NY (US)

(72) Inventors: Konstantinos Christidis, Raleigh, NC (US); Nitin Gaur, Roundrock, TX (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 15/834,522

(22) Filed: Dec. 7, 2017

(65) Prior Publication Data
US 2019/0179672 A1 Jun. 13, 2019

(51) Int. Cl.
*G06F 9/50* (2006.01)

(52) U.S. Cl.
CPC ............ *G06F 9/5044* (2013.01); *G06F 9/505* (2013.01); *G06F 2209/503* (2013.01); *G06F 2209/5015* (2013.01)

(58) Field of Classification Search
None
See application file for complete search history.

(56) References Cited

U.S. PATENT DOCUMENTS

| | | | |
|---|---|---|---|
| 8,515,792 | B2 | 10/2013 | Agarwala et al. |
| 8,775,593 | B2 | 7/2014 | O'Sullivan et al. |
| 9,513,627 | B1 | 12/2016 | Elazary et al. |
| 9,608,933 | B2 | 3/2017 | Emaru |
| 9,659,267 | B2 | 5/2017 | Li et al. |
| 2005/0138162 | A1 | 6/2005 | Byrnes |
| 2010/0036698 | A1 | 2/2010 | Garrison et al. |
| 2016/0335533 | A1 | 11/2016 | Davis et al. |
| 2017/0032344 | A1 | 2/2017 | Attolini et al. |
| 2017/0180469 | A1 | 6/2017 | Ford et al. |
| 2017/0220998 | A1 | 8/2017 | Horn et al. |
| 2018/0103042 | A1 | 4/2018 | Castagna et al. |
| 2018/0218342 | A1* | 8/2018 | Linn .................. G06Q 20/3678 |
| 2018/0247302 | A1 | 8/2018 | Armstrong et al. |
| 2018/0316717 | A1 | 11/2018 | Kozloski et al. |
| 2018/0357683 | A1 | 12/2018 | Pickover et al. |
| 2019/0014124 | A1* | 1/2019 | Reddy .................. H04L 63/108 |
| 2019/0087893 | A1 | 3/2019 | Pellew |
| 2019/0103192 | A1 | 4/2019 | Bent et al. |
| 2019/0116051 | A1 | 4/2019 | Rome et al. |
| 2019/0228429 | A1 | 7/2019 | Mottur et al. |

OTHER PUBLICATIONS

List of IBM Patents or Patent Applications Treated as Related, Jun. 14, 2018.

(Continued)

*Primary Examiner* — Sisley N Kim

(57) ABSTRACT

An example operation may include one or more of identifying a blockchain transaction requiring completion, identifying one or more task requests associated with the blockchain transaction, determining a number of different qualities of service required to complete the one or more task requests, and determining a number of service provider blockchain members are required to complete the one or more task requests based on a number of different available resources assigned to the service provider blockchain members.

20 Claims, 12 Drawing Sheets

(56) References Cited

OTHER PUBLICATIONS

Konstantinos Christidis et al, Enforcing Compute Equity Models in Distributed Blockchain, U.S. Appl. No. 15/834,768, filed Dec. 7, 2017.
Konstantinos Christidis et al, Enforcing Compute Equity Models in Distributed Blockchain, U.S. Appl. No. 15/834,458, filed Dec. 7, 2017.
Auslander et al., "The evolution of the MVS operating system." IBM Journal of Research and Development 25.5 (1981): 471-482, Section Resource allocation p. 6.
Catalini et al., Some simple economics of the blockchain. No. w22952. National Bureau of Economic Research, 2016, pp. 12, 18, 20.
Norta, "Setup of Cross-Organizational Collaborations for Decentralized Autonomous Organizations.", Department of Informatics, Tallinn University of Technology, date not available, but there exist references dated 2014, p. 12.

* cited by examiner

1

ENFORCING COMPUTE EQUITY MODELS IN DISTRIBUTED BLOCKCHAIN

TECHNICAL FIELD

This application generally relates to identifying compute equity models in a blockchain, and more particularly, to enforcing compute equity models in distributed blockchain networks.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in a blockchain blocks, which are secured from tampering and revision due to their immutable properties. Each block contains a timestamp and a link to a previous block. A blockchain can be used to hold, track, transfer and verify any information. Because a blockchain is a distributed system, before adding a transaction to the blockchain ledger, all peers need to reach a consensus status.

Blockchain networks are generally intended to be decentralized networks to operate decentralized application(s), which may run diverse sets of hardware and software stacks. While blockchains may adhere to certain minimum requirements and standard criteria, the market forces will provide an array of choices to the industry and a varied quality of service at varying costs. This presents a challenge for equitable compute equity required for compute intensive functions, such as a crypto-processing and consensus algorithms. As a result, some participants may have to pay a larger share to maintain a certain quality of service (QoS) for transaction processing. The parties to the blockchain which are lacking in computing resources may require support or may be reprimanded for failing to maintain the adequate minimum QoS requirements. Parties may be evaluated and such information may provide a baseline for current, future and shared resource allocation among members of the blockchain.

In other examples, decreasing the processing time of potential parallel processing type tasks, resource-intensive or time-sensitive computing tasks may be performed via concurrent use of multiple central processing units, graphical processing units (CPUs, GPU, etc.). The tasks may be assigned to computing clusters that are being operated and maintained by a single stakeholder, such as a cloud provider. However, simplifying the creation of the computing clusters may be desirable. One approach may include multiple non-trusting processing unit owners which work together and cooperate/coordinate reliably for the management, assignment, and execution of resource-intensive tasks. A blockchain may provide a backbone for such a coordination effort.

SUMMARY

One example embodiment may provide a method that includes one or more of identifying a blockchain transaction, determining a penalty metadata token assigned to a member associated with the blockchain transaction, determining a penalty coefficient rating based on the penalty metadata token assigned to the member, and determining whether to accept the blockchain transaction based on the penalty coefficient rating.

Another example embodiment may include an apparatus that provides a processor configured to perform one or more of identify a blockchain transaction, determine a penalty metadata token assigned to a member associated with the blockchain transaction, determine a penalty coefficient rating based on the penalty metadata token assigned to the member, and determine whether to accept the blockchain transaction based on the penalty coefficient rating.

Yet another example embodiment may include non-transitory computer readable storage medium configured to store instructions that when executed causes a processor to perform one or more of identifying a blockchain transaction, determining a penalty metadata token assigned to a member associated with the blockchain transaction, determining a penalty coefficient rating based on the penalty metadata token assigned to the member, and determining whether to accept the blockchain transaction based on the penalty coefficient rating.

Still another example embodiment may include a method configured to perform one or more of identifying a blockchain transaction submitted from a requestor member of the blockchain, identifying one or more task requests associated with the blockchain transaction, determining one or more blockchain members having resources available for completing the one or more task requests, and the resources are identified via known computing parameters associated with each of the one or more blockchain members, and assigning the one or more task requests to the one or more blockchain members based on the resources available.

Still yet another example embodiment may include an apparatus that includes a processor configured to perform one or more of identify a blockchain transaction submitted from a requestor member of the blockchain, identify one or more task requests associated with the blockchain transaction, determine one or more blockchain members having resources available for completing the one or more task requests, and the resources are identified via known computing parameters associated with each of the one or more blockchain members, and assign the one or more task requests to the one or more blockchain members based on the resources available.

Still yet another example embodiment may include a non-transitory computer readable storage medium configured to store instructions that when executed causes a processor to perform one or more of identifying a blockchain transaction submitted from a requestor member of the blockchain, identifying one or more task requests associated with the blockchain transaction, determining one or more blockchain members having resources available for completing the one or more task requests, and the resources are identified via known computing parameters associated with each of the one or more blockchain members, and assigning the one or more task requests to the one or more blockchain members based on the resources available.

Yet still a further example embodiment may include a method configured to perform one or more of identifying a blockchain transaction requiring completion, identifying one or more task requests associated with the blockchain transaction, determining a plurality of different qualities of service required to complete the one or more task requests, and determining a plurality of service provider blockchain members are required to complete the one or more task requests based on a plurality of different available resources assigned to the plurality of the service provider blockchain members.

Yet still other embodiments may include an apparatus that includes a processor configured to perform one or more of identify a blockchain transaction requiring completion, identify one or more task requests associated with the blockchain transaction, determine a plurality of different qualities of service required to complete the one or more task requests, and determine a plurality of service provider blockchain members are required to complete the one or more task requests based on a plurality of different available resources assigned to the plurality of the service provider blockchain members.

Yet still further, another example embodiment may include a non-transitory computer readable storage medium configured to store instructions that when executed causes a processor to perform one or more of identifying a blockchain transaction requiring completion, identifying one or more task requests associated with the blockchain transaction, determining a plurality of different qualities of service required to complete the one or more task requests, and determining a plurality of service provider blockchain members are required to complete the one or more task requests based on a plurality of different available resources assigned to the plurality of the service provider blockchain members.

DETAILED DESCRIPTION

Figure 1A:
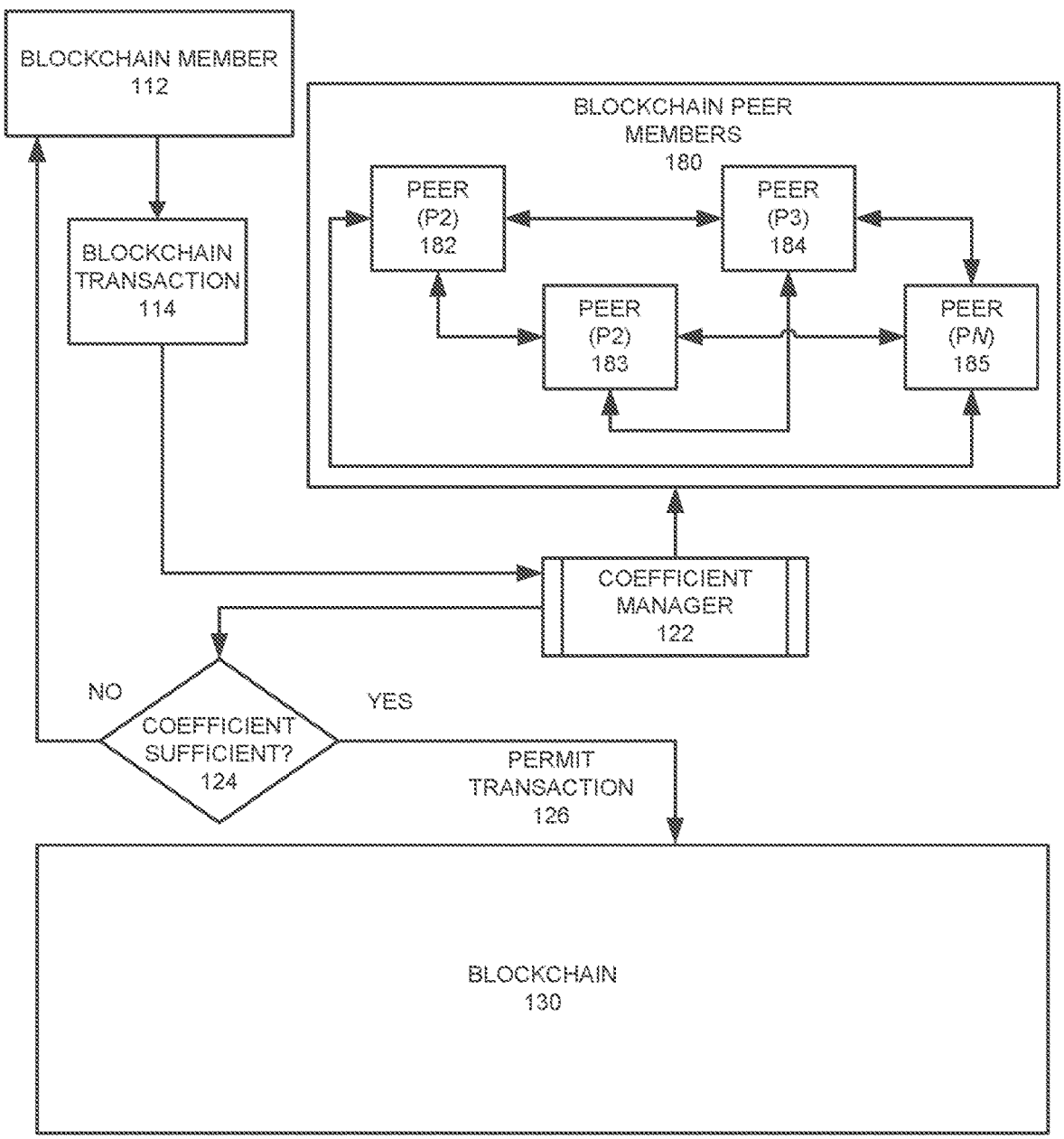
FIG. 1A illustrates a logic diagram of a blockchain member compute equity model, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to identifying compute equity models in a blockchain, and in another embodiment relates to determining individual compute equity models for participating blockchain members and enforcing requirements, rights and other network optimization strategies.

As referred to herein, a blockchain is a distributed system consisting of multiple nodes that communicate with each other. The blockchain runs programs called chaincode (e.g., smart contracts, etc.), holds state and ledger data, and executes transactions. Transactions are operations invoked on the chaincode. Transactions typically must be "endorsed" and only endorsed transactions may be committed and have an effect on the state of the blockchain system. There may exist one or more special chaincodes for management functions and parameters, collectively called system chaincodes.

Nodes are the communication entities of the blockchain system. A "node" is a logical function in the sense that multiple nodes of different types can run on the same physical server. Nodes are grouped in trust domains and associated to logical entities that control them in various ways. Nodes may include different types such as a client or submitting-client node which submits a transaction-invocation to an endorser (e.g., peer), and broadcasts transaction-proposals to an ordering service (e.g., ordering node). Another type of node is a peer node which receives client submitted transactions, commits the transactions and maintains the state and a copy of the ledger. Peers can also have the role of an endorser, although it is not a requirement. The ordering-service-node or orderer is a node running the communication service for all nodes and which implements a delivery guarantee, such as atomic or total order broadcast to each of the peer nodes in the system when committing transactions and modifying the world state.

The ledger is a sequenced, tamper-resistant record of all state transitions of the blockchain. State transitions are a result of chaincode invocations (i.e., transactions) submitted by participating parties (e.g., client nodes, ordering nodes, endorser nodes, peer nodes, etc.). A transaction may result in a set of asset key-value pairs that are committed to the ledger as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

The chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added block represents every transaction on the chain that has come before it, making it possible to ensure that all peer nodes are in a consistent and trusted state. The chain may be stored on the peer node file system (either local or attached storage), efficiently supporting the append-only nature of the blockchain workload.

The current state of the immutable ledger represents the latest values for all keys that are included in the chain transaction log. Because the current state represents the latest key values known to the channel, it is sometimes referred to as a world state. Chaincode invocations execute transactions against the current state data of the ledger. To make these chaincode interactions efficient, the latest values of the keys may be stored in the state database. The state database may be simply an indexed view into the chain's transaction log, it can therefore be regenerated from the chain at any time. The state database may automatically get recovered (or generated if needed) upon peer node startup, and before transactions are accepted.

Example embodiments provide methods, devices, networks and/or systems, which enforce compute equity models in a diverse/distributed blockchain network. By determining compute equity of various blockchain members and their respective members without applying chargeback, the compute equity model may be applied to any of the blockchain members participating on the blockchain. According to one example embodiment an algorithmic model may be used that balances compute resources by balancing the types of workload across a varied set of infrastructure models, while maintaining organizational boundaries, such as membership, type of role, smart contract processing, etc. One approach may be using a blockchain and assigned penalty metadata and coefficients to enable functions for a task manager for incoming computing task delegation.

In one example, metadata attributes of a blockchain member organization may be determined while assigning any identified deficiencies via a penalty metadata attribute (s), such as time taken to process, sign and/or encrypt a transaction payload either occurring at a node in the blockchain network or originating from the node in the network. For example, assigning a penalty metadata attribute and enforcing compute resources required to expend time on processing, and penalizing the transaction at an initialization stage may be performed, which may include a 'decide', 'form', 'sign' and/or 'submit state' to incentivize the upkeep of resource requirements of that node or its corresponding network of nodes.

In many blockchain transaction processing configurations there are various stages of processing, including but not limited to the following ten examples, such as decide (d), form (f), sign (si), submit (su), relay-distribute (rd), propose (p), agree (a), execute (e), validate (v), and confirm (c). Among those various processing stages, a penalty coefficient (Pco) is designated as time taken to process, sign and/or encrypt a transaction payload either going into the node in a network or coming from the node in the network, and if necessary, also devising a chargeback by a network operator. Penalty metadata can also be represented in the form of a token, where a node in a network with a lowest token or lowest coefficient will delay the transaction submission.

One example expression may include a penalty metadata/token as: $x=t[p, rd, a, e, v]+t[d, f, si, su]$, where t=time and the penalty token is x. The function of time is based on any or more of the ten example processing stages. The penalty coefficient 'Pco' of a particular node 'y' may be determined as: $xPco [node\ y]=(d+f+si+su)/x$. The penalty coefficient of a node is based on the ability of the node to submit a transaction to be processed. Also, a feedback mechanism is used to ensure node 'y' can either update its HW/SW infrastructure or engage in a penalty metadata/token swap and/or an off-chain charge back configuration.

In one example, a use case scenario may be based on rendering three-dimensional (3D) computing models of data. The complex processor models or graphics processing unit (GPU) intensive jobs may require hours to days to complete on a single machine. However, rendering tasks may be conducted in a parallel processing format, which may decrease the rendering time by assigning such processing tasks to a network of renderers.

In a blockchain network, each node may be a GPU renderer owned by a separate organization. The nodes may provide both processing/rendering capabilities rendering needs to the organization which owns them and by relaying that service to the network of other entities and organizations, and to serve rendering tasks by other nodes in the network. In operation, requests, submitted transactions, originating from member nodes on the network, such as requests to have a 3D model rendered within a rough time period (i.e., 2 hours), may include references to models along with a desired deadline for executing the task. At any time, a network resource allocation engine may assess a current aggregate spare GPU capacity, and the corresponding blockchain may provide a medium to record and share how each node has performed as a renderer in the past. For instance, how many rendering tasks have been completed successfully during the past 60 days, or what is their average processing rate based on previous processing efforts. Such information may be readily ascertained or identified in a table of processing statistics identified for each node and updated for every transaction which is received and committed to the blockchain.

In one example, if a blockchain member "A" submits a render task "foo" to render a 3D model within the next 600 seconds, then before this task enters the queue of network tasks, the task may undergo a penalty computation phase where the task is assigned a penalty metadata according to how the requesting blockchain member has performed as a server/renderer in the past 60 days. The penalty metadata/token calculation may be based on parameters associated with the previous transactions. For instance, assume that the blockchain record at the time of 3D request submission provides that member 'A' was assigned with two tasks over the past 60 days, where: 'task 1' required 2 minutes of processing work, and 'task 2' required 5 minutes of processing work. The task sizes may be observed along with all other data available to establish an accurate baseline of the task processing scenarios previously conducted. Continuing with the same example, the blockchain record demonstrates that the task was actually delivered in a total of nine minutes (e.g., three minutes for 'task 1', six minutes for 'task 2'). As a result, member A's 60-day 'moving aggregate' delay, measured as the quantity: t(a+e+v+c)−t(promised), is actually 180 seconds. The resulting calculation, or any derivative of this quantity, is essentially the penalty metadata that "tags" request "foo". The network further scales this penalty quantity up or down, depending on the current aggregate spare GPU capacity. If the network has spare capacity, there may be an opportunity to lower the penalty and perform the requested task faster.

In one example embodiment, a blockchain member may be evaluated when attempting to access, write and/or perform other blockchain tasks. When a blockchain member attempts to access/write a blockchain transaction, the system may evaluate their computing platform based on known parameters, new parameters, previous transactions, etc. The member's penalty coefficient may be identified as a cumulative score based on various parameters. If the penalty coefficient is too low, the member may require additional computing resources, may receive suggestions, requirements, etc., and/or options for finalizing their transaction/block/query, etc., or whatever operation is attempting to be conducted at that time.

In another example embodiment, an enforcement function may be imposed to interact with all members, determine their assigned penalties and make decisions on how to finalize transactions and/or distribute a task among the members. For example, if a task having various requirements and a large amount of computing resources is identified, the members may be selected/de-selected to participate in the task completion effort based on their known computing resource levels and previously logged blockchain data based on distributed and varying membership statuses, task completion efforts may be queued and assigned accordingly to achieve successful completion status.

In another example embodiment, a system load balancing configuration may include various tasks which are large-scale blockchain enabled tasks which require load balancing among the members which are assigned to any number of "N" tasks at any given time. Larger core processing portions of tasks may be assigned to larger known and reputable entities, while smaller sub-tasks and tasks are assigned to less reputable and smaller entities for processing, and those entities in-between may be allocated less to medium-sized tasks based on known penalty coefficients.

FIG. 1A illustrates a logic diagram of a blockchain member compute equity model, according to example embodiments. Referring to FIG. 1A, the configuration 100 includes a blockchain member 112 submitting a blockchain transaction 114 to be reviewed and accepted/rejected by a group of blockchain peer members 180 (182-185) responsible for determining the validity of the transaction and the member's status. In this configuration, the coefficient manager 122 may be a software module or processing engine that determines whether the coefficient of that particular member is sufficient 124 or not. The member's coefficient may be determined prior to accepting the transaction, and the coefficient may be identified as a numerical number and compared to a threshold operating coefficient to determine whether it is sufficiently high enough to be permitted by the members 180. The members may vote (i.e., reach consensus) on an acceptable operating status or coefficient level of the members in order to permit them to submit transactions 126. The members with low coefficients may require additional computing power to meet time constraints (QoS) or other constraints deemed necessary for that particular blockchain 130.

Figure 1B:
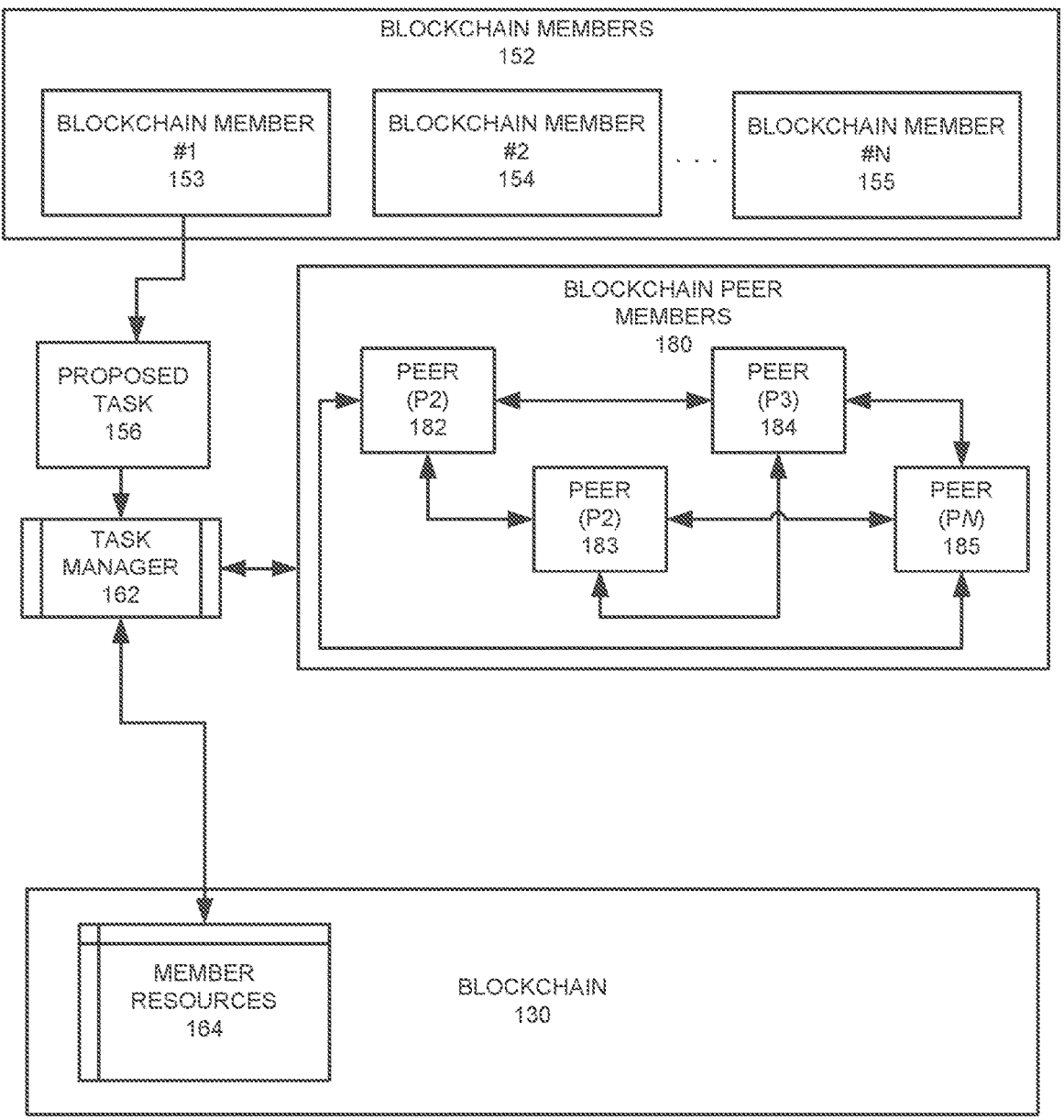
FIG. 1B illustrates a logic diagram of a blockchain task management configuration, according to example embodiments.

FIG. 1B illustrates a logic diagram of a blockchain task management configuration, according to example embodiments. Referring to FIG. 1B, in this configuration 150, the blockchain members 152 (153-155) may be part of a task committee that uses large-scale computing resources (i.e., network resources, cloud resources, etc.) to perform computing intensive tasks, such as image rendering, etc. The task may be identified 156 as a project requiring an estimated amount of time, CPU usage, memory, etc. The task manager 162, may be a computing module that is responsible for determining the magnitude of the task while comparing system resources of various members and their availability and agreement to perform those tasks. The blockchain 130 may be a reference model for storing member resources 164 necessary to complete the task. The task manager 162 may identify those resources and the best member candidates for assigning the task based on member resources 164 identified in the blockchain 130 and the peer members' decision 180.

Owners of processing units and processing capacity platforms may operation their computing nodes as 'members' of the blockchain system of peers 182-185, and form a compute network of registered members 180. The members may also act as clients of the blockchain network 152, which may submit requests to have their tasks processed by the compute network of available resources from any of the members. In one example, the members 152 may submit and communicate their request by encoding the request along with the associated processing requirements, time-constraints, and other task parameters into a blockchain transaction as a proposed task 156 seeking fulfillment by other members which have resources and are desiring to seek the reward or cooperation credits for assisting with the task processing. Anytime members commit resources to the task processing platform managed by the blockchain 130, those members may be awarded credits for the future to have their own tasks processed.

The blockchain 130 contains a log of all past task assignments and execution cycles. Also, the members may have their compute resources logged for availability audits when identifying potential task assignments. For example, each member may have a profile list of compute platform information and whether such resources are available. The profile information may be stored in the blockchain as one or more transactions (i.e., member resources) similar to the task requests which are also received and processed to be logged in the blockchain via the task manager.

A proposed task transaction reaches the task manager 162 which computes the penalty metadata required for that particular request by consulting the logged blockchain transactions. The task manager 162 then assesses the current individual and aggregate spare computing capacity of the network based on known member resources 164. This can be implemented via a message heartbeat analysis among the members of the blockchain network. An aggregate metric may be used to scale-up or scale-down a penalty coefficient, and tag the request with the aggregate metric. Assuming the transaction can proceed, the task assignment may be assigned to members 180 of the blockchain network that are best suited for completing the requested task with the specified criteria and/or within the specified deadlines.

One example use case for soliciting task assignment may include rendering 3D display models. This may include a complex GPU-intensive task that may require hours or days to complete on one or more computing machines. However, rendering tasks may be performed in parallel or are 'parallelizable' on various processing platforms made available through the blockchain member network of computing devices, and thus the rendering time may be decreased by assigning these tasks to a plurality of network members as device renderers. In the blockchain network each node/device may be a GPU renderer owned by separate organizations each of which are identified through the blockchain network. This provides computer-based rendering to any assigned task whether the rendering task is assigned to one or multiple nodes in the blockchain network. The rendering requests (i.e., submitted transaction tasks) may be identified by a message, such as "I wish to have this 3D model rendered within the next 2 hours." The information submitted with a task may be parsed for references to specific requirements, a desired deadline for executing the task, etc.

At any time, the blockchain network can assess the current aggregate spare GPU capacity to assign to a new task, and provide a record of how each node has performed as a renderer in the past. For instance, how many rendering tasks have been completed successfully during a previous period (i.e., past 60 days) or what is the average processing rate for those previously solicited entities. Processing tasks may be identified by a series of operations, such as agree/execute/validate/confirm, (a/e/v/c). In this example, a blockchain member "A" submitting a render task "foo", with instructions to "render this 3D model within the next 600 seconds", may be identified and assigned to a task completion effort. Before the task is assigned to the task queue of the network, the task may process through a penalty computation phase, and may assigned a penalty metadata according to how the member, who's now a requester, had performed as a server/renderer in the past 60 days. Assuming that a blockchain record at the time of submission shows that a member 'A' was assigned with two tasks over the past 60 days, where task one required two minutes of processing work, and task two required five minutes of processing work, then the blockchain record may also demonstrate that the task was actually delivered in a total of nine minutes, with three minutes for task one and six minutes for task two. As a result, member A's 60-day 'moving aggregate' delay (i.e., the quantity=t(a+e+v+c)−t(promised)) is actually 180 seconds. The resulting quantity, or any derivative of this quantity, is essentially the penalty metadata that "tags" the request "foo". The network further scales this penalty quantity up or down, depending on the current aggregate spare GPU capacity. If the network has spare capacity at that time, the logic would identify a chance to lower the penalty and submit the request faster.

Figure 1C:
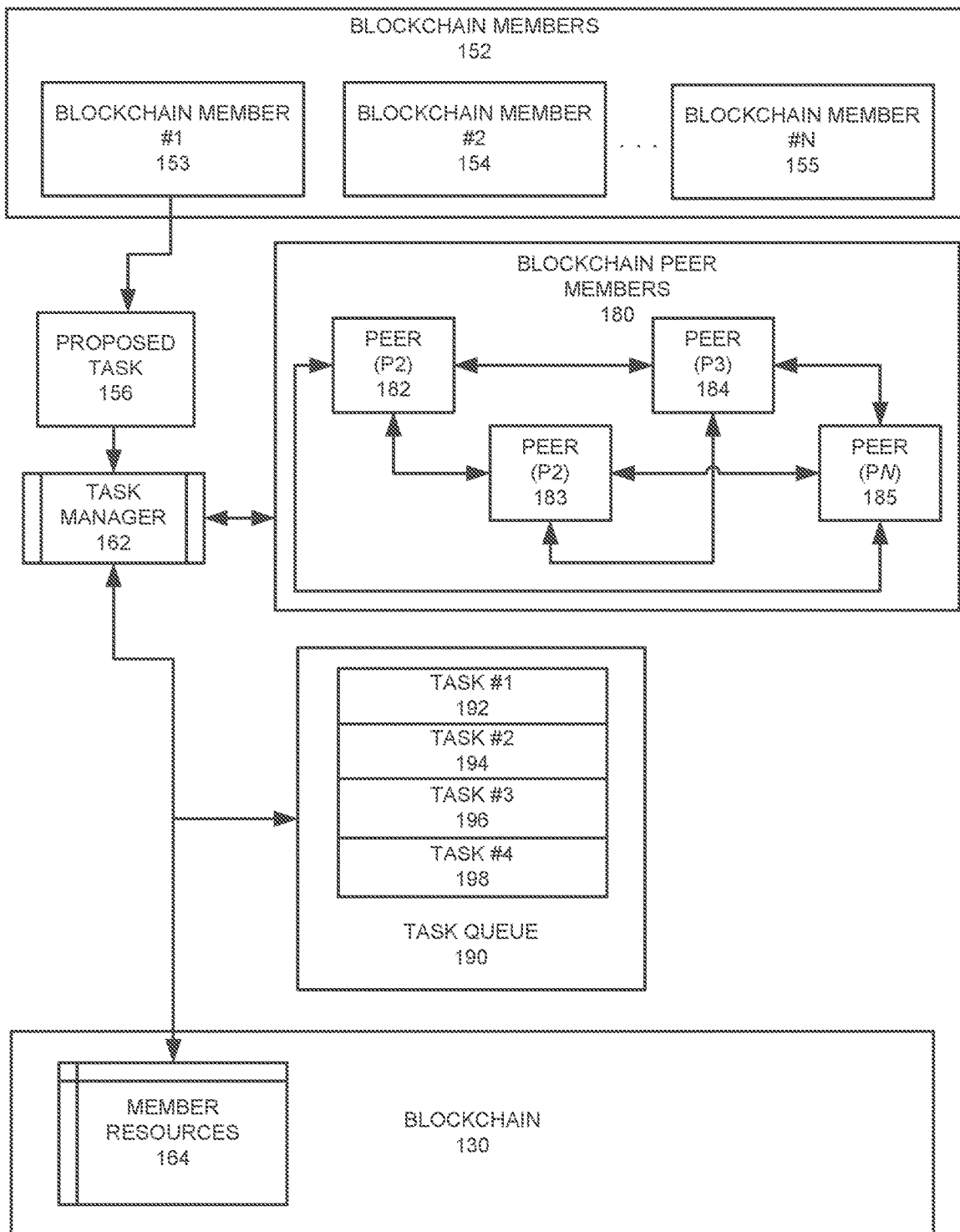
FIG. 1C illustrates a logic diagram of a blockchain multi-task management configuration, according to example embodiments.

FIG. 1C illustrates a logic diagram of a blockchain multi-task management configuration, according to example embodiments. In this configuration 170, the proposed task 156 may be one of many tasks received and queued 190 as a set of tasks (192-198), which the task manager 162 must delegate to the computing resources available from the blockchain members 152. The member resources 164 may provide a large-scale compute equity model that is identified as a resource pool used to delegate the tasks.

In large-scale blockchain networks, where there is a possibility of providing blockchain services to various networks, such as a consensus as a service/transaction processing service, trust validation service, and/or ordering as a service, it may be possible to determine whether there are sufficient enough resources. Instead, there may be a need to solicit/hire/enroll other members of the blockchain to perform a particular blockchain transaction. There are many service providers providing various different qualities of service(s), the objective may then be to ensure that a certain blockchain specific workload type is sent to an appropriate service provider.

Large-scale equity management for maintaining a quality of service (QoS) in a blockchain may provide a digital transaction network with a specific agreed upon service level agreement (SLAs) while ensuring that overloading of service providers for blockchain services does not occur. By obtaining SLA metadata from a service requestor, such as a penalty or reward coefficient from a service provider via a predictive analytics module operating at each service provider and/or requestor, an operational model may be created which solicits the service providers for resources and compliance. For example, based on respective penalty coefficients, a decision may be made as to whether there are currently enough providers or whether there is a need to hire additional other members of the blockchain to perform the present and/or future transactions.

In operation, each task that is received has a corresponding SLA metadata as identified from the request sent by the service requestor entity. Other attributes may include a current penalty or reward coefficient from a service provider and a predictive analytics module at each service provider and requestor. A trust coordinator module may perform task coordination via trust validation, consensus and transaction processing among other tasks. Each component either provides information in the form of metadata and tags, or consumes information to make decisions and task coordination. The predictive analytics module will combine several sources of information and provide predictive elements of a penalty coefficient, which will be used by the trust coordinator to make effective task routing and coordination efforts. The trust coordinator performs this task on a periodic basis to ensure that one or more tasks are assigned and coordinated to meet the stated SLAs required for such tasks. This approach differs from traditional load balancing which is observed in network routing where the routing and division of a task, and subsequent assigning of tasks is specific to certain networks. For instance, a network may use a specific consensus algorithm with specific crypto-algorithms, and with blockchain validation, the consensus models are not permitted to change.

In a decentralized network, a varying workload level and impact of a workload on a trust processing capability can cause a higher penalty coefficient leading to not only retracting an active transaction, but also declining processed transactions due to a lower than acceptable coefficient. In operation, a trust coordinator (TC) receives processed blockchain transactions ready to be committed with a low penalty coefficient implying that a denial of service (DOS) attack or a compromise has occurred. The trust coordinator can reject the processed transaction and until a higher or acceptable coefficient is identified. This implies that there is a before and after coefficient analysis performed. For example, a request which requires a certain acceptable coefficient may undergo a determination as to whether it is acceptable or if the transaction needs to be re-processed/re-assigned.

The predictive analytics (PA) components may suggest to send a transaction to a set of nodes and suggest to the TC the nodes that are capable of processing transactions based on a required QoS. The TC can then also predict, based on queues or pipelines of transactions, that the TC may have a degraded coefficient, the PA then works with the TC to proactively coordinate a new set of nodes to send subsequent processing transactions either by tagging or creating new queues with node metadata and coefficients. The SLA metadata may be part of every transaction with a level of trust needed, an acceptable coefficient, and a time window for the transaction, and thus if a transaction is not processed and returned by a certain period of time the transaction will expire and will be sent to be reprocessed at the bottom of the queue. The predictive analytics module may reside on all the nodes in a network to ensure the analysis of the coefficient is analyzed. The trust coordinator may perform the queueing and analysis of the SLA metadata. Information from a predictive analytics module and subsequent receipt of processed transaction is maintained by the coordinator where expired transactions are requeued for reprocessing or returned with an unsatisfactory trust validation. This can be a service specific to a node/organization or can be a distributed service.

Figure 2A:
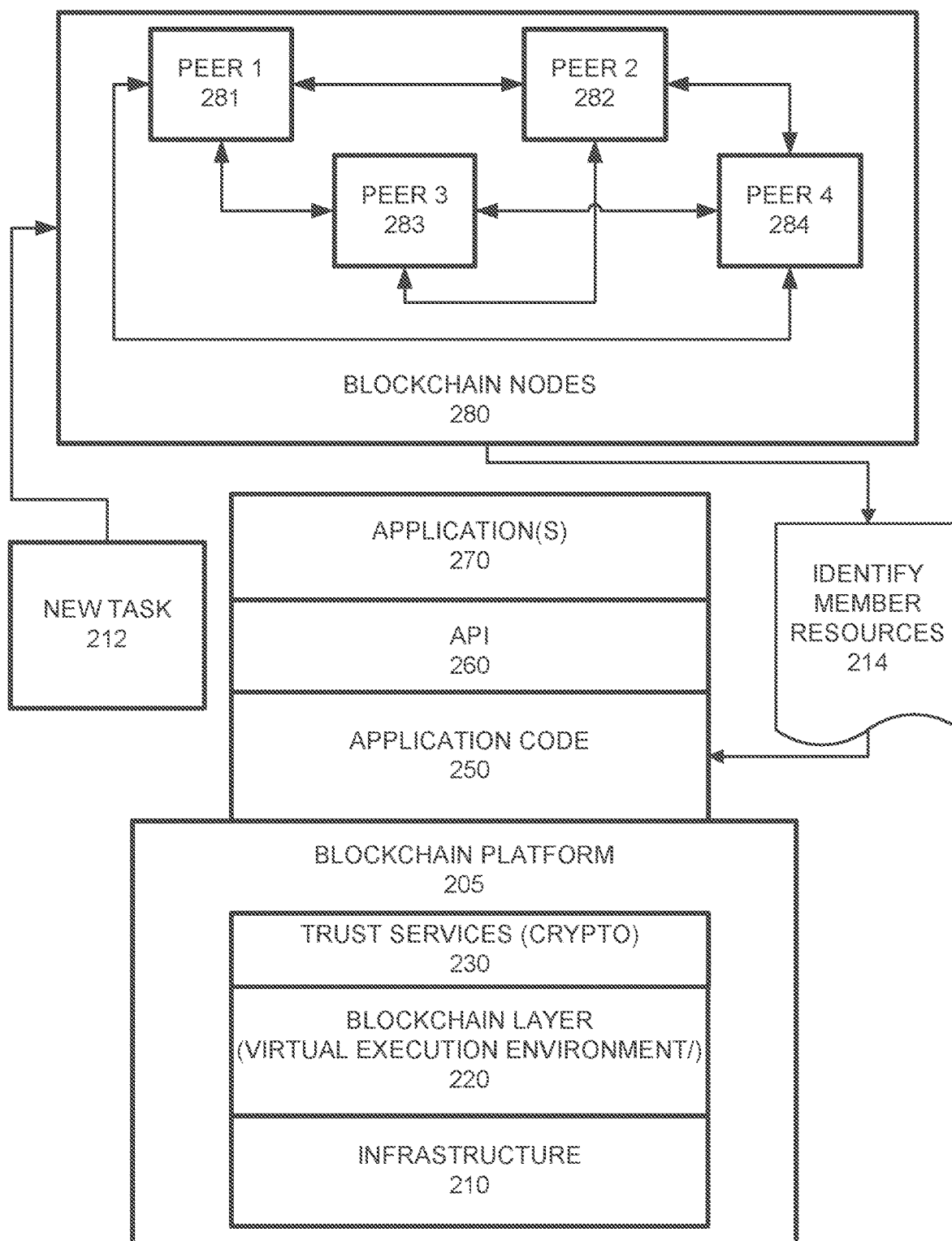
FIG. 2A illustrates an example blockchain configuration for performing compute equity management, according to example embodiments.

FIG. 2A illustrates a blockchain system architecture configuration 200A, according to example embodiments. Referring to FIG. 2A, blockchain architecture 200A may include certain blockchain elements, for example, a group 280 of blockchain nodes 281-284 which participate in blockchain transaction addition and validation process (consensus). One or more of the blockchain nodes 281-284 may endorse transactions and one or more blockchain nodes 281-281 may provide an ordering service for all blockchain nodes in the architecture 200A. A blockchain node may initiate a blockchain authentication and seek to write to a blockchain immutable ledger stored in blockchain layer 220, a copy of which may also be stored on the underpinning physical infrastructure 210. The blockchain configuration may include one or applications 270 which are linked to application programming interfaces (APIs) 260 to access and execute stored program/application code 250 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 281-284.

The blockchain base or platform 205 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain architecture configuration of FIG. 2A may process and execute program/application code 250 via one or more interfaces exposed, and services provided, by blockchain platform 205. The code 250 may control blockchain assets. For example, the code 250 can store and transfer data, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, hashed identifier information received from a client device may be processed by one or more processing entities (e.g., virtual machines) included in the blockchain layer 220. The result may include access being granted to a third party application from the blockchain computing environment. In this example, the previously known user identifiers or data template information may be stored in the blockchain platform 205. The physical machines 210 may be accessed to retrieve the user device template and the information can be used to match against incoming user identifiers for verification purposes.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In this example of FIG. 2A, the identification of member resources 222 may be performed in response to one or more tasks requiring processing or management. A new task 212 may be identified by the blockchain nodes 280 and an analysis of resources required to complete the task is performed prior to contacting members for resource pooling efforts. Ultimately, the task completion is based on identifying the needed resources and securing those resources by willing members.

Figure 2B:
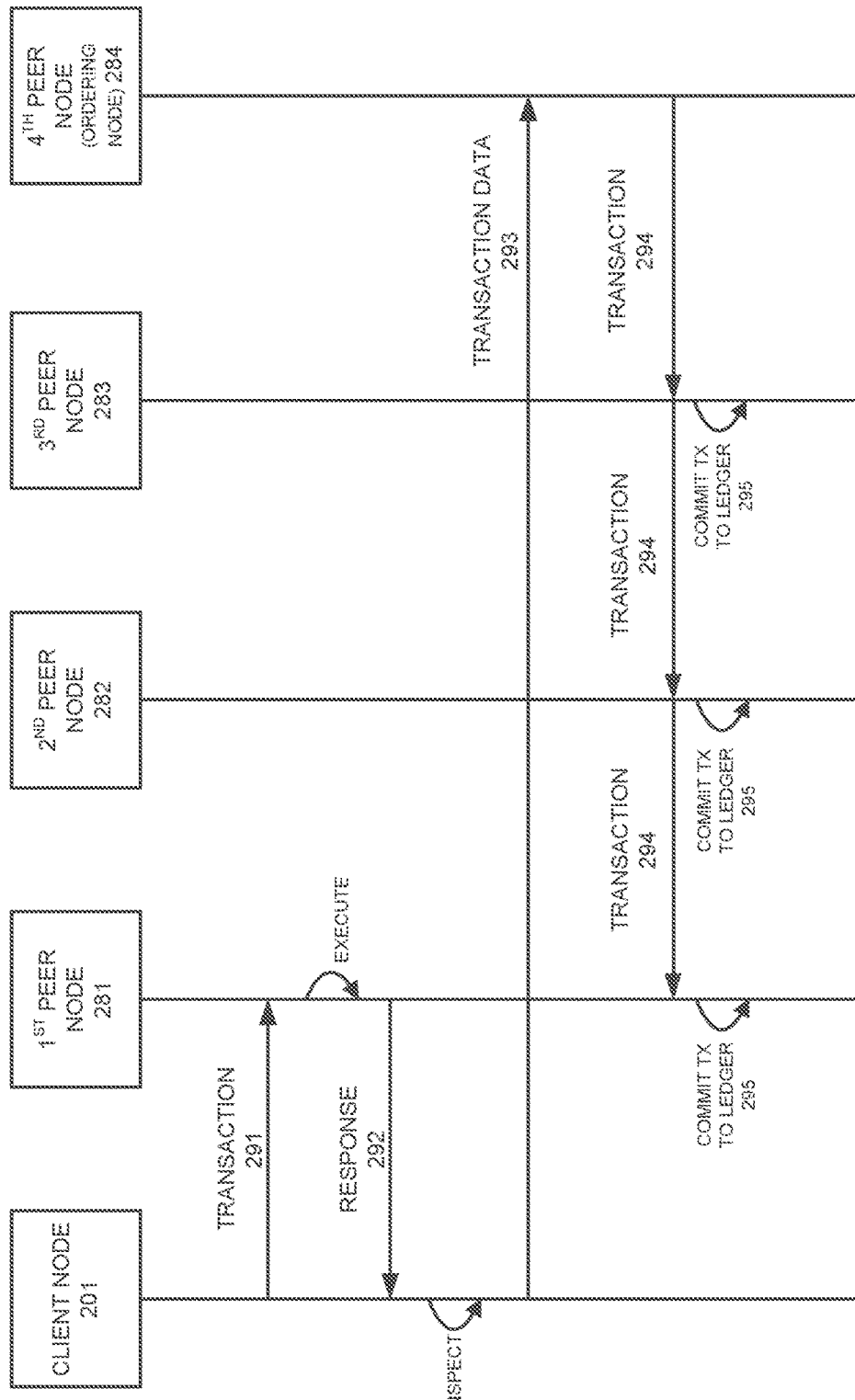
FIG. 2B illustrates an example peer node blockchain configuration for performing compute equity management, according to example embodiments.

FIG. 2B illustrates an example of a transactional flow 200B between nodes of the blockchain in accordance with an example embodiment. Referring to FIG. 2B, the transaction flow may include a transaction proposal sent by an application client node 201 to an endorsing peer node 281. The endorsing peer 281 may verify the client signature, and execute a chaincode function to simulate the transaction. The output is the chaincode results, a set of key/value versions that were read in the chaincode (read set), and the set of keys/values that were written in chaincode (write set). The proposal response gets sent back to the client 201 along with an endorsement signature. The client assembles the endorsements into a transaction payload and broadcasts it to an ordering service node 284. The ordering service node 284 then delivers ordered transactions as blocks to all peers 281-283 on a channel. Before committal, each peer 281-283 may validate the transactions. For example, they may check the endorsement policy to ensure that the correct allotment of the specified peers have signed the results, and authenticate the signatures against the transaction payload.

Referring to FIG. 2B, in step 291 the client node 201 initiates the transaction by constructing and sending a request to the peer node 281 which is an endorser. The client 201 may include an application leveraging a supported software development kit (SDK) such as Node, Java, Python, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over gRPC) and take the client's cryptographic credentials to produce a unique signature for this transaction proposal.

In response, the endorsing peer node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In step 292, the set of these values, along with the endorsing peer node's 281 signature is passed back as a proposal response to the SDK of the client 201 which parses the payload for the application to consume.

In response, the application of the client 201 inspects/verifies the endorsing peers signatures and compares the proposal responses to determine if the proposal response is the same. If the chaincode only queried the ledger, the application would inspect the query response and would typically not submit the transaction to the ordering service 284. If the client application intends to submit the transaction to ordering service 284 to update the ledger, the application determines if the specified endorsement policy has been fulfilled before submitting (i.e., did peer nodes necessary for the transaction both endorse). Here, the client may include only one of multiple parties to the transaction. In this case, each client may have their own endorsing node, and each endorsing node will need to endorse the transaction. The architecture is such that even if an application chooses not to inspect responses or otherwise forwards an unendorsed transaction, the endorsement policy will still be enforced by peers and upheld at the commit validation phase.

After successful inspection, in step 293 the client 201 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation; it may simply receive transactions from all channels in the network, order them chronologically by channel, and create blocks of transactions per channel.

In step 294, the blocks of the transaction are delivered from the ordering node 284 to all peer nodes 281-283 on the channel. The transactions within the block are validated to ensure endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as notification of whether the transaction was validated or invalidated.

Figure 3:
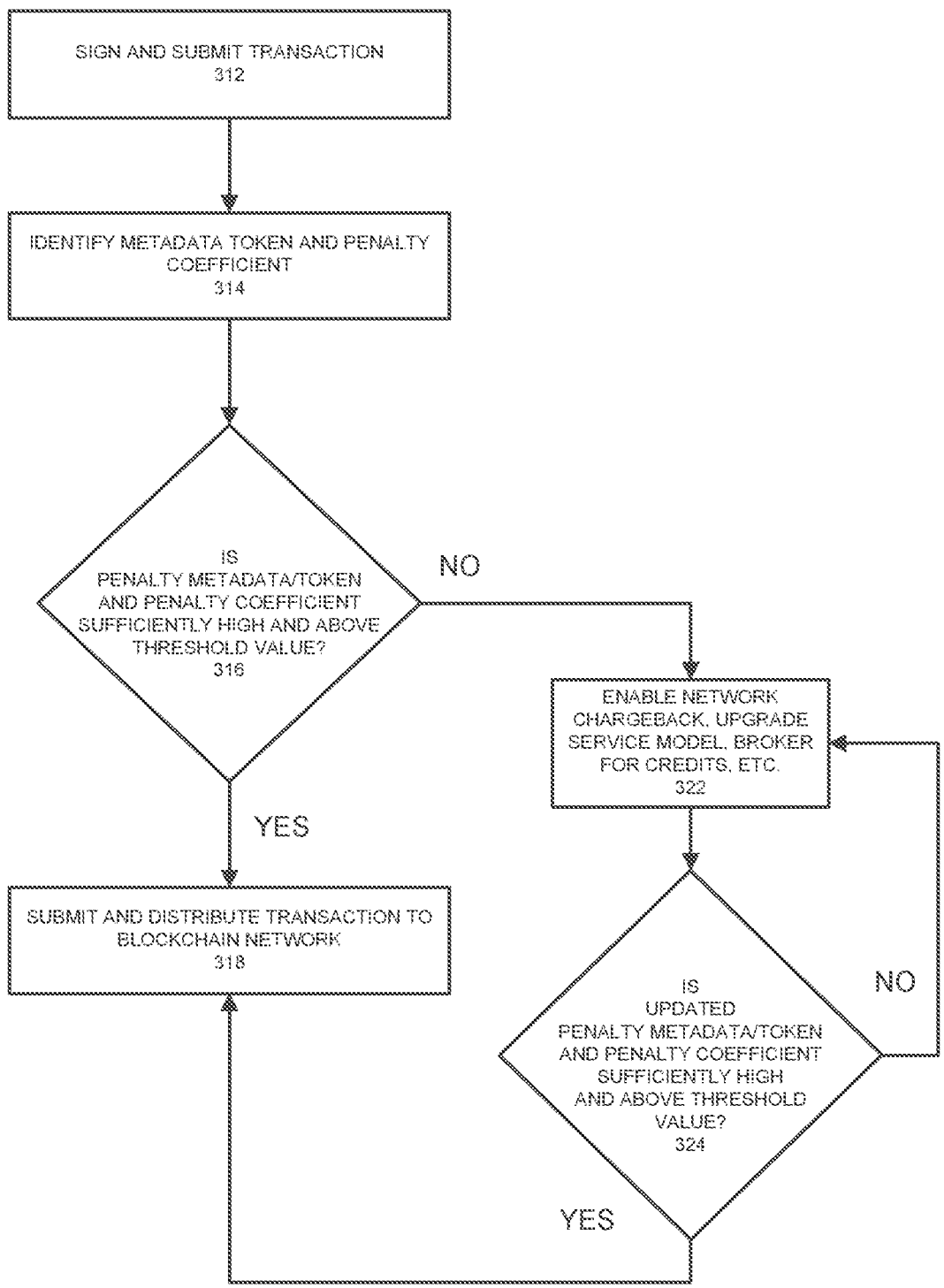
FIG. 3 illustrates a flow diagram of the logic included in a compute equity determination procedure for a blockchain member, according to example embodiments.

FIG. 3 illustrates a flow diagram of the logic included in a compute equity determination procedure for a blockchain member, according to example embodiments. In this configuration 300, the requestor blockchain member may submit a transaction 312 which is signed and submitted for commitment to the blockchain. The requestor may be identified as having an assigned metadata token and/or penalty coefficient 314. A determination may be made as to whether the value of the coefficient is sufficiently high enough to meet or exceed a threshold value 316, which may be assigned by the blockchain peers. If so, the blockchain transaction is submitted and committed to the blockchain 318. If not, the network may enable a chargeback or other requirement for service upgrades, which may invoke partnerships and compensation required to other network resources for adequate computing resources 322. For example, the member may solicit other members for computing resources in order to reach the necessary level of compliance managed by the blockchain peers. A redetermination may be performed to ensure the values are sufficiently high 324, then the transaction may be committed when the resources are confirmed.

Figure 4:
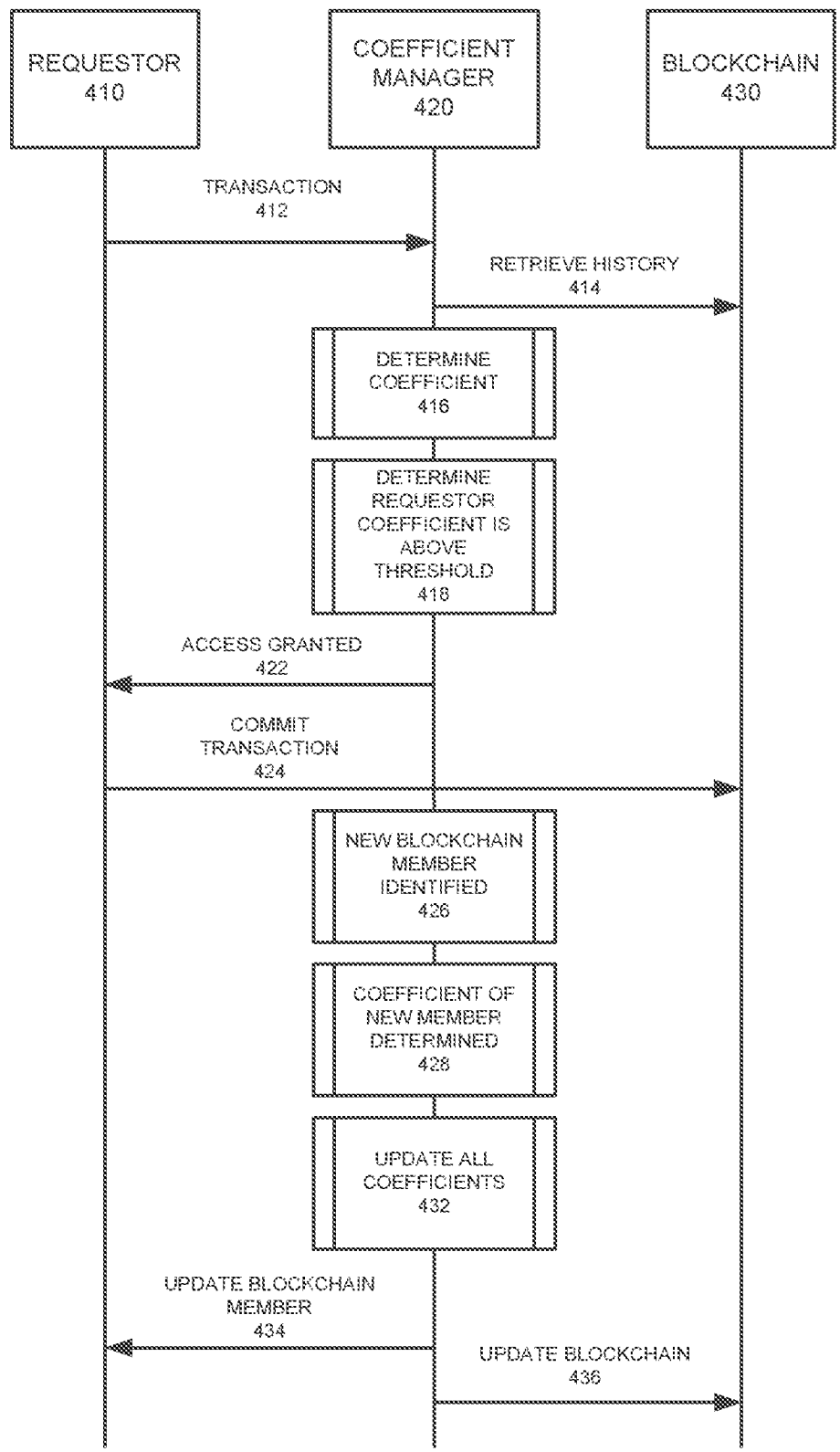
FIG. 4 illustrates a system messaging diagram for performing a compute equity determination for a blockchain member, according to example embodiments.

FIG. 4 illustrates a system messaging diagram for performing a compute equity determination for a blockchain member, according to example embodiments. Referring to FIG. 4A, the method may 400 include the requester 410 submitting a blockchain transaction 412, which is intercepted by a coefficient manager 420, which determines the requestor's relative level of compliance with the blockchain regulations. The manager may retrieve requestor history information 414 from the blockchain 430 or other member profile information necessary to determine the requestor's resource information needed to calculate the member's operating penalty coefficient 416. The threshold required by the blockchain may be compared to the requestor penalty coefficient 418 in order to determine whether the request should be granted or denied. In this example, the request is granted 422 and the transaction can then be committed 424 to the blockchain. In a subsequent processing operation, new members to the blockchain may be identified 426 and all the previous member penalty coefficients may require a recalculation 432 based on the new member coefficient 428. The blockchain member 434 may be updated to have a new coefficient and the blockchain 436 may be updated to include such profile information of the members.

Figure 5A:
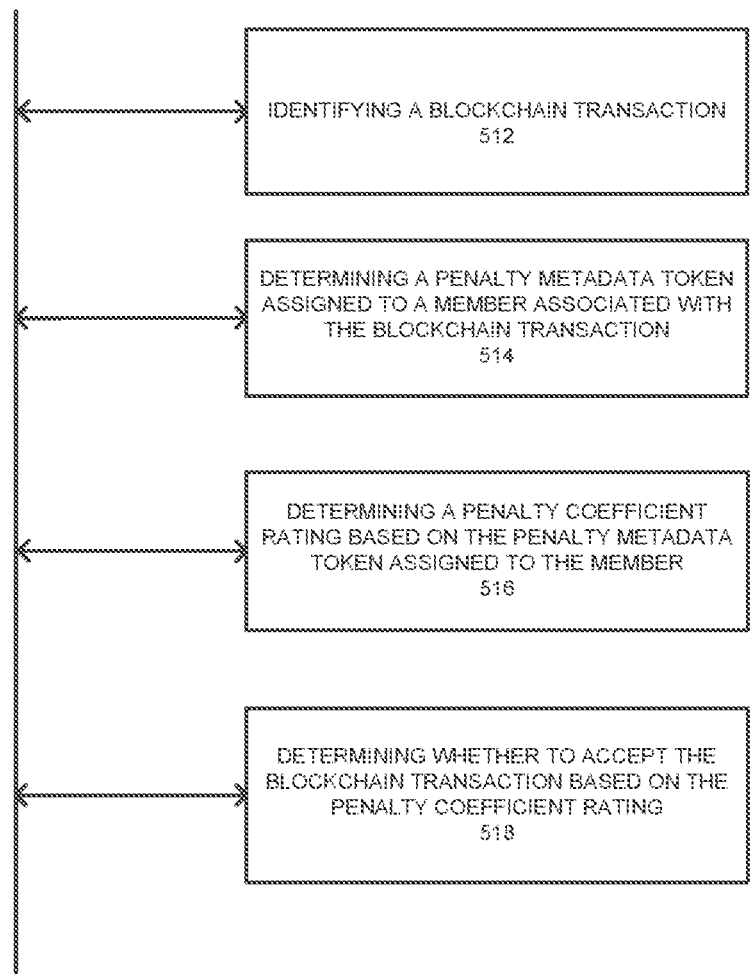
FIG. 5A illustrates a flow diagram of an example method of performing compute equity determinations, according to example embodiments.

FIG. 5A illustrates a flow diagram of an example method of performing compute equity determinations, according to example embodiments. Referring to FIG. 5A, the method 500 may include identifying a blockchain transaction 512, determining a penalty metadata token assigned to a member associated with the blockchain transaction 514, determining a penalty coefficient rating based on the penalty metadata token assigned to the member 516, and determining whether to accept the blockchain transaction based on the penalty coefficient rating 518. The blockchain transaction is accepted when the penalty coefficient rating exceeds a current penalty threshold. The blockchain transaction is rejected when the penalty coefficient rating does not exceed a current penalty threshold. The method may also include when determining whether to accept the blockchain transaction further performing identifying a current penalty threshold required for processing the blockchain transaction, determining whether the penalty coefficient rating exceeds the current penalty threshold, and accepting the blockchain transaction when the penalty coefficient rating exceeds the current penalty threshold. The method may also include performing a consensus determination via a plurality of blockchain member nodes to accept or reject the blockchain transaction. The consensus determination is based on a current penalty threshold. The method may also include identifying one or more of the plurality of blockchain members with an acceptable penalty coefficient rating, and accepting the blockchain transaction based on the one or more of the plurality of blockchain members which have the acceptable penalty coefficient rating.

Figure 5B:
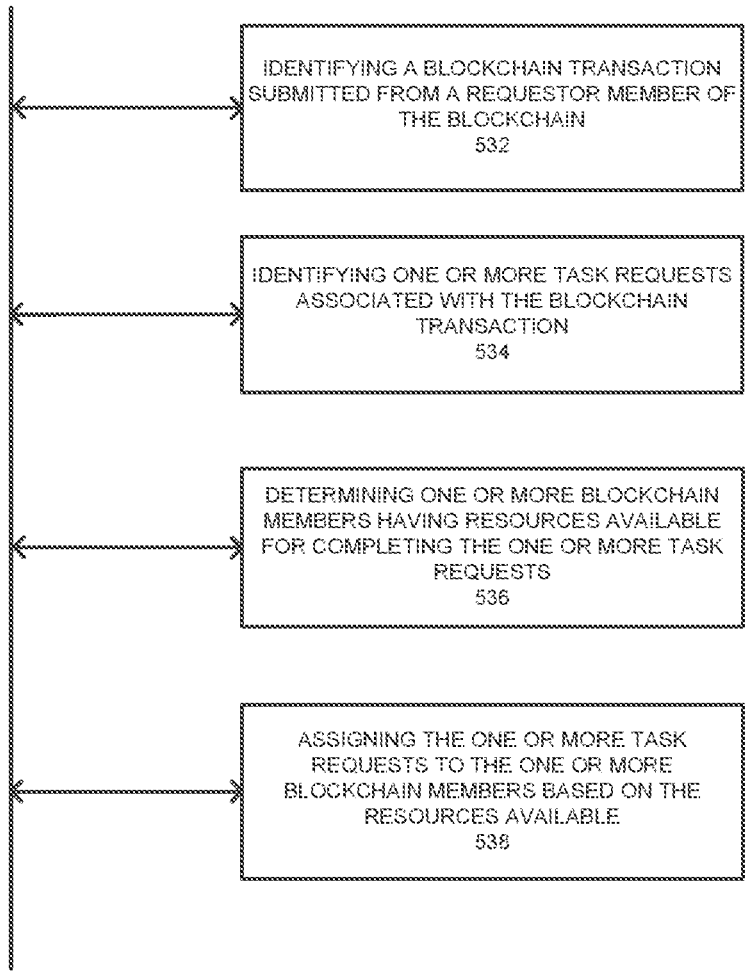
FIG. 5B illustrates a flow diagram of another example method of performing compute equity determinations, according to example embodiments.

FIG. 5B illustrates a flow diagram of another example method of performing compute equity determinations, according to example embodiments. This example 530 provides a task assignment for a task based on available resources. The method may include identifying a blockchain transaction submitted from a requestor member of the blockchain 532, identifying one or more task requests associated with the blockchain transaction 534, determining one or more blockchain members having resources available for completing the one or more task requests, and the resources are identified via known computing parameters associated with each of the one or more blockchain members 536, and assigning the one or more task requests to the one or more blockchain members based on the resources available 538. The one or more task requests may include a processor rendering task. The identifying operation of the one or more task requests may also include identifying computational requirements to complete the one or more task requests. The computational requirements include current availability of the one or more blockchain members, processing capacity of the one or more blockchain members and computational history of the one or more blockchain members. The method may also include identifying a time constraint to complete the one or more task requests, and assigning the one or more task requests to a set of the one or more blockchain members having the computational requirements to complete the one or more tasks within the time constraint. The method may also include processing the one or more task requests in parallel via the set of the one or more blockchain members, and the set includes two or more blockchain members. The method may also include determining a penalty metadata associated with the requestor, determining an aggregate spare level of computational resources available from the one or more blockchain members, and the assigning of the one or more task requests to the one or more blockchain members further includes assigning the one or more task requests based on a function of the penalty metadata and the aggregate spare level of the computational resources available from the one or more blockchain members.

Figure 5C:
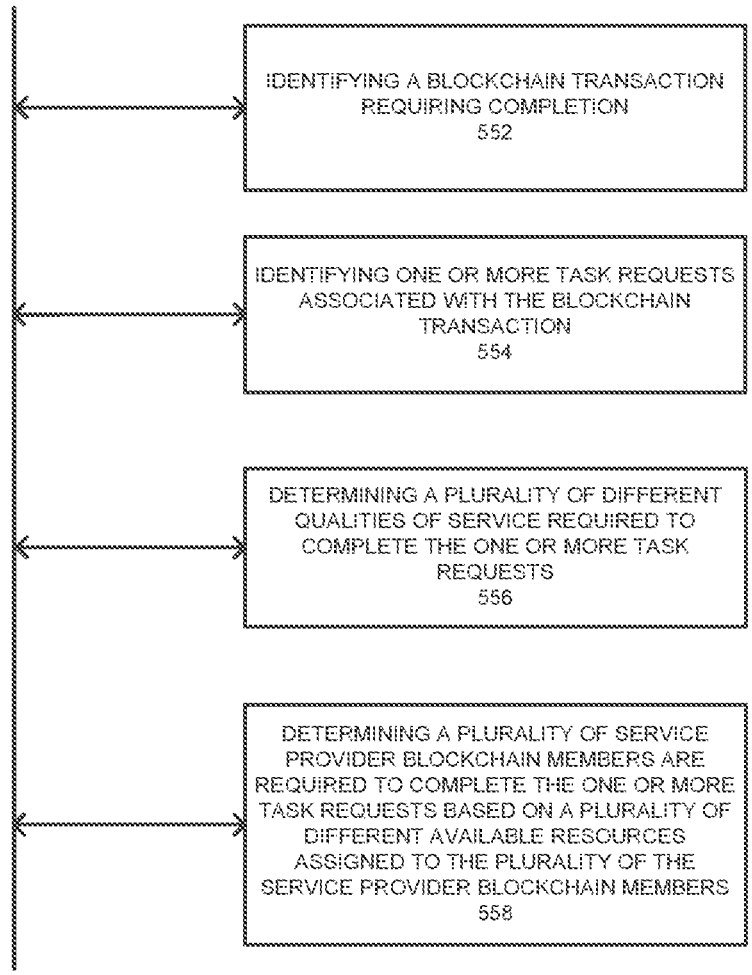
FIG. 5C illustrates a flow diagram of yet another example method of performing compute equity determinations, according to example embodiments.

FIG. 5C illustrates a flow diagram of yet another example method of performing compute equity determinations, according to example embodiments. The method 550 may also include identifying a blockchain transaction requiring completion 552, identifying one or more task requests associated with the blockchain transaction 554, determining a plurality of different qualities of service required to complete the one or more task requests 556, and determining a plurality of service provider blockchain members are required to complete the one or more task requests based on a plurality of different available resources assigned to the plurality of the service provider blockchain members 558. The plurality of different available resources may include a plurality of different qualities of service. The method may also include identifying a service level agreement (SLA) metadata associated with the one or more task requests, wherein the SLA metadata identifies SLA requirements for completing the one or more tasks, determining whether there are currently enough service provider blockchain members to satisfy the SLA requirements, and when it is determined that additional service provider blockchain members are required to complete the one or more tasks, assigning additional service provider blockchain members to complete the one or more tasks. The SLA metadata may include one or more of a penalty coefficient and a reward coefficient. The method may also include identifying the blockchain transaction has been completed, determining a penalty coefficient associated with the blockchain transaction is below a predetermined penalty coefficient threshold, and rejecting the blockchain transaction from being committed to the blockchain. The method may also include identifying the rejected blockchain transaction has a new higher penalty coefficient, and permitting the blockchain transaction to be committed to the blockchain when the new higher penalty coefficient is above the predetermined penalty coefficient threshold. The method may further includes identifying a queue of task requests currently pending prior to receiving the one or more tasks, predicting a penalty coefficient to assign to the one or more tasks, and assigning the one or more tasks to one or more of the plurality of service provider blockchain members based on the predicted penalty coefficient.

Figure 5D:
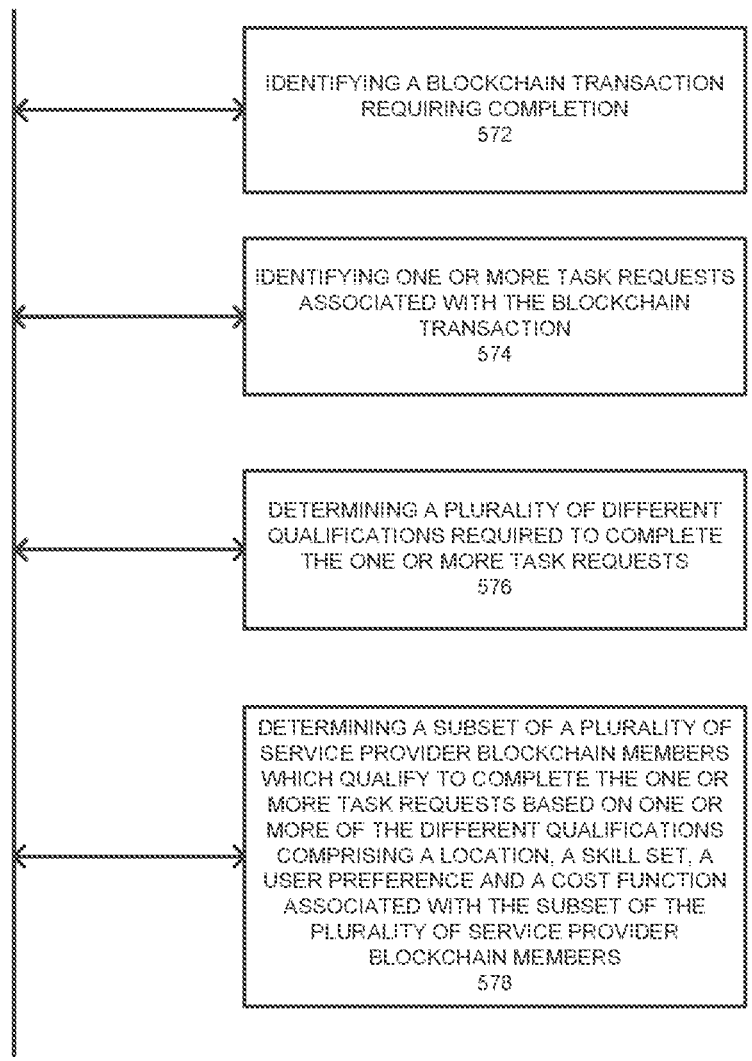
FIG. 5D illustrates a flow diagram of still another example method of performing compute equity determinations, according to example embodiments.

FIG. 5D illustrates a flow diagram of still another example method of performing compute equity determinations, according to example embodiments. The method 570 may include identifying a blockchain transaction requiring completion 572, identifying one or more task requests associated with the blockchain transaction 574, determining a plurality of different qualifications required to complete the one or more task requests 576, and determining a subset of a plurality of service provider blockchain members which qualify to complete the one or more task requests based on one or more of the different qualifications comprising a location, a skill set, a user preference and a cost function associated with the subset of the plurality of service provider blockchain members 578.

In addition to the cost basis and other fundamental variables which are examined when soliciting blockchain members to complete work orders and/or tasks, certain basic parameters may be used as a basis to select a subset of blockchain members which are qualified to complete the task(s). User preferences, geographical location, known skill sets, costs, etc., may all be some of the factors to identify from the blockchain members to perform the task identified in the blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
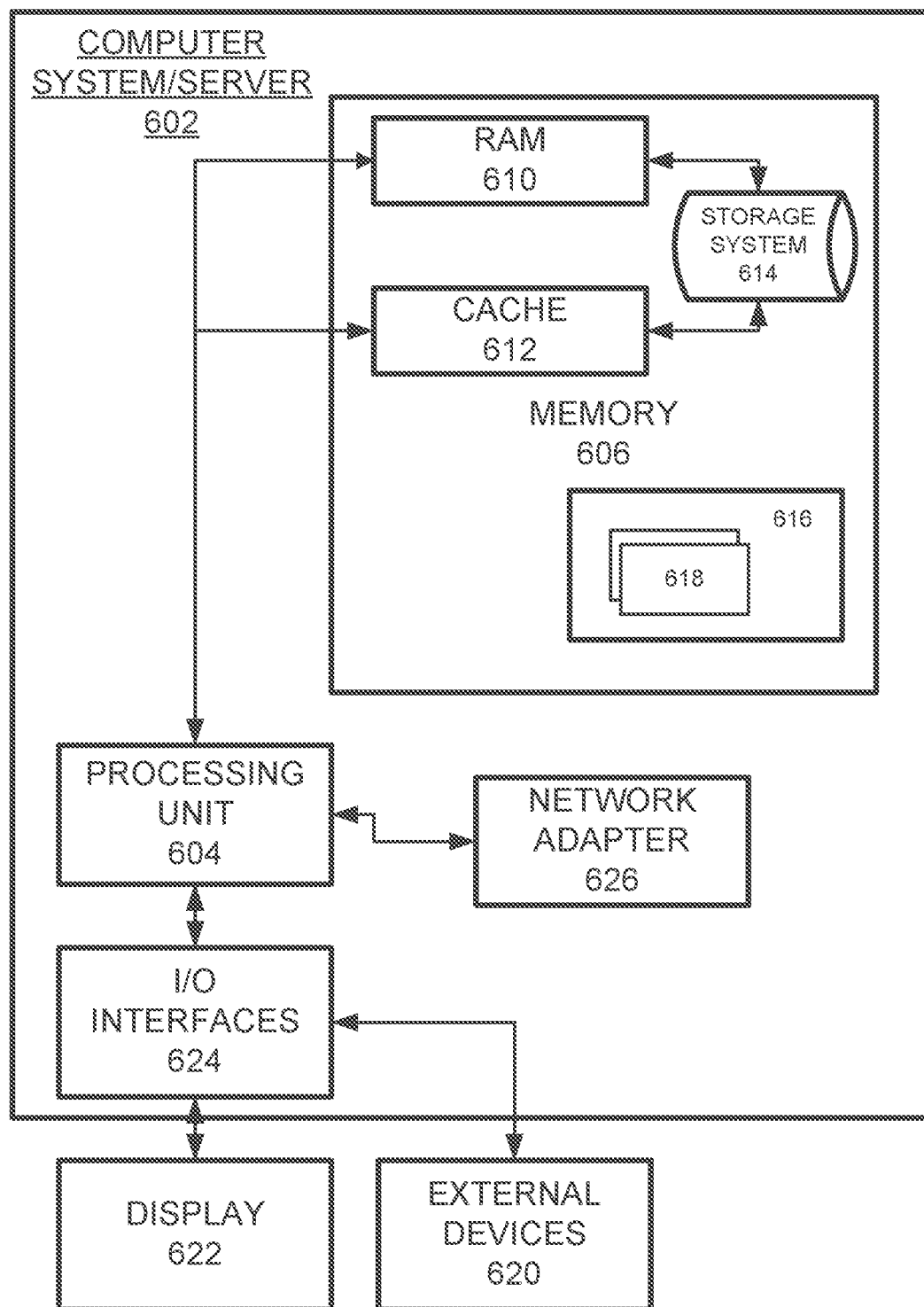
FIG. 6 illustrates an example computer system/server configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying a blockchain transaction requiring completion;
   identifying one or more task requests associated with the blockchain transaction;
   determining a plurality of different qualities of service required to complete the one or more task requests;
   determining a plurality of service provider blockchain members are required to complete the one or more task requests based on a plurality of different available resources assigned to the plurality of the service provider blockchain members; and
   imposing an enforcement function to interact with the plurality of service provider blockchain members, the enforcement function selecting/deselecting a service provider blockchain member, of the plurality of service provider blockchain members, for completing the one or more task requests based on a penalty to each service provider blockchain member.

2. The method of claim 1, wherein the plurality of different available resources comprise a plurality of different qualities of service.

3. The method of claim 1, further comprising:
   identifying a service level agreement (SLA) metadata associated with the one or more task requests, wherein the SLA metadata identifies SLA requirements for completing the one or more tasks;
   determining whether there are currently enough service provider blockchain members to satisfy the SLA requirements; and
   when it is determined that additional service provider blockchain members are required to complete the one or more tasks, assigning additional service provider blockchain members to complete the one or more tasks.

4. The method of claim 3, wherein the SLA metadata comprises one or more of a penalty coefficient and a reward coefficient.

5. The method of claim 1, further comprising:
identifying the blockchain transaction has been completed;
determining a penalty coefficient associated with the blockchain transaction is below a predetermined penalty coefficient threshold; and
rejecting the blockchain transaction from being committed to the blockchain.

6. The method of claim 5, further comprising:
identifying the rejected blockchain transaction has a new higher penalty coefficient; and
permitting the blockchain transaction to be committed to the blockchain when the new higher penalty coefficient is above the predetermined penalty coefficient threshold.

7. The method of claim 1, further comprising:
identifying a queue of task requests currently pending prior to receiving the one or more tasks;
predicting a penalty coefficient to assign to the one or more tasks; and
assigning the one or more tasks to one or more of the plurality of service provider blockchain members based on the predicted penalty coefficient.

8. An apparatus, comprising:
a processor configured to:
identify a blockchain transaction requiring completion;
identify one or more task requests associated with the blockchain transaction;
determine a plurality of different qualities of service required to complete the one or more task requests;
determine a plurality of service provider blockchain members are required to complete the one or more task requests based on a plurality of different available resources assigned to the plurality of the service provider blockchain members; and
impose an enforcement function to interact with the plurality of service provider blockchain members, the enforcement function selecting/deselecting a service provider blockchain member, of the plurality of service provider blockchain members, for completing the one or more task requests based on a penalty to each service provider blockchain member.

9. The apparatus of claim 8, wherein the plurality of different available resources comprise a plurality of different qualities of service.

10. The apparatus of claim 8, wherein the processor is further configured to:
identify a service level agreement (SLA) metadata associated with the one or more task requests, wherein the SLA metadata identifies SLA requirements for completing the one or more tasks;
determine whether there are currently enough service provider blockchain members to satisfy the SLA requirements; and
when it is determined that additional service provider blockchain members are required to complete the one or more tasks, assign additional service provider blockchain members to complete the one or more tasks.

11. The apparatus of claim 10, wherein the SLA metadata comprises one or more of a penalty coefficient and a reward coefficient.

12. The apparatus of claim 8, wherein the processor is further configured to:
identify the blockchain transaction has been completed;
determine a penalty coefficient associated with the blockchain transaction is below a predetermined penalty coefficient threshold; and
reject the blockchain transaction from being committed to the blockchain.

13. The apparatus of claim 12, wherein the processor is further configured to:
identify the rejected blockchain transaction has a new higher penalty coefficient; and
permit the blockchain transaction to be committed to the blockchain when the new higher penalty coefficient is above the predetermined penalty coefficient threshold.

14. The apparatus of claim 8, wherein the processor is further configured to:
identify a queue of task requests currently pending prior to receiving the one or more tasks;
predict a penalty coefficient to assign to the one or more tasks; and
assign the one or more tasks to one or more of the plurality of service provider blockchain members based on the predicted penalty coefficient.

15. A non-transitory computer readable storage medium configured to store one or more instructions that when executed by a processor causes the processor to perform:
identifying a blockchain transaction requiring completion;
identifying one or more task requests associated with the blockchain transaction;
determining a plurality of different qualities of service required to complete the one or more task requests;
determining a plurality of service provider blockchain members are required to complete the one or more task requests based on a plurality of different available resources assigned to the plurality of the service provider blockchain members; and
imposing an enforcement function to interact with the plurality of service provider blockchain members, the enforcement function selecting/deselecting a service provider blockchain member, of the plurality of service provider blockchain members, for completing the one or more task requests based on a penalty to each service provider blockchain member.

16. The non-transitory computer readable storage medium of claim 15, wherein the plurality of different available resources comprise a plurality of different qualities of service.

17. The non-transitory computer readable storage medium of claim 15, wherein the one or more instructions are further configured to cause the processor to perform:
identifying a service level agreement (SLA) metadata associated with the one or more task requests, wherein the SLA metadata identifies SLA requirements for completing the one or more tasks;
determining whether there are currently enough service provider blockchain members to satisfy the SLA requirements; and
when it is determined that additional service provider blockchain members are required to complete the one or more tasks, assigning additional service provider blockchain members to complete the one or more tasks.

18. The non-transitory computer readable storage medium of claim 17, wherein the SLA metadata comprises one or more of a penalty coefficient and a reward coefficient.

19. The non-transitory computer readable storage medium of claim 15, wherein the one or more instructions are further configured to cause the processor to perform:
identifying the blockchain transaction has been completed;

determining a penalty coefficient associated with the blockchain transaction is below a predetermined penalty coefficient threshold;

rejecting the blockchain transaction from being committed to the blockchain;

identifying the rejected blockchain transaction has a new higher penalty coefficient; and permitting the blockchain transaction to be committed to the blockchain when the new higher penalty coefficient is above the predetermined penalty coefficient threshold.

20. The non-transitory computer readable storage medium of claim 15, wherein the one or more instructions are further configured to cause the processor to perform:

identifying a queue of task requests currently pending prior to receiving the one or more tasks;

predicting a penalty coefficient to assign to the one or more tasks; and assigning the one or more tasks to one or more of the plurality of service provider blockchain members based on the predicted penalty coefficient.

* * * * *